Sept. 15, 1925.  1,554,020
H. P. MOWRER
TIRE CARRIER
Filed Feb. 26, 1925   2 Sheets-Sheet 1

Inventor
Homer P. Mowrer

By Watson E. Coleman
Attorney

Sept. 15, 1925.
H. P. MOWRER
TIRE CARRIER
Filed Feb. 26, 1925
1,554,020
2 Sheets-Sheet 2
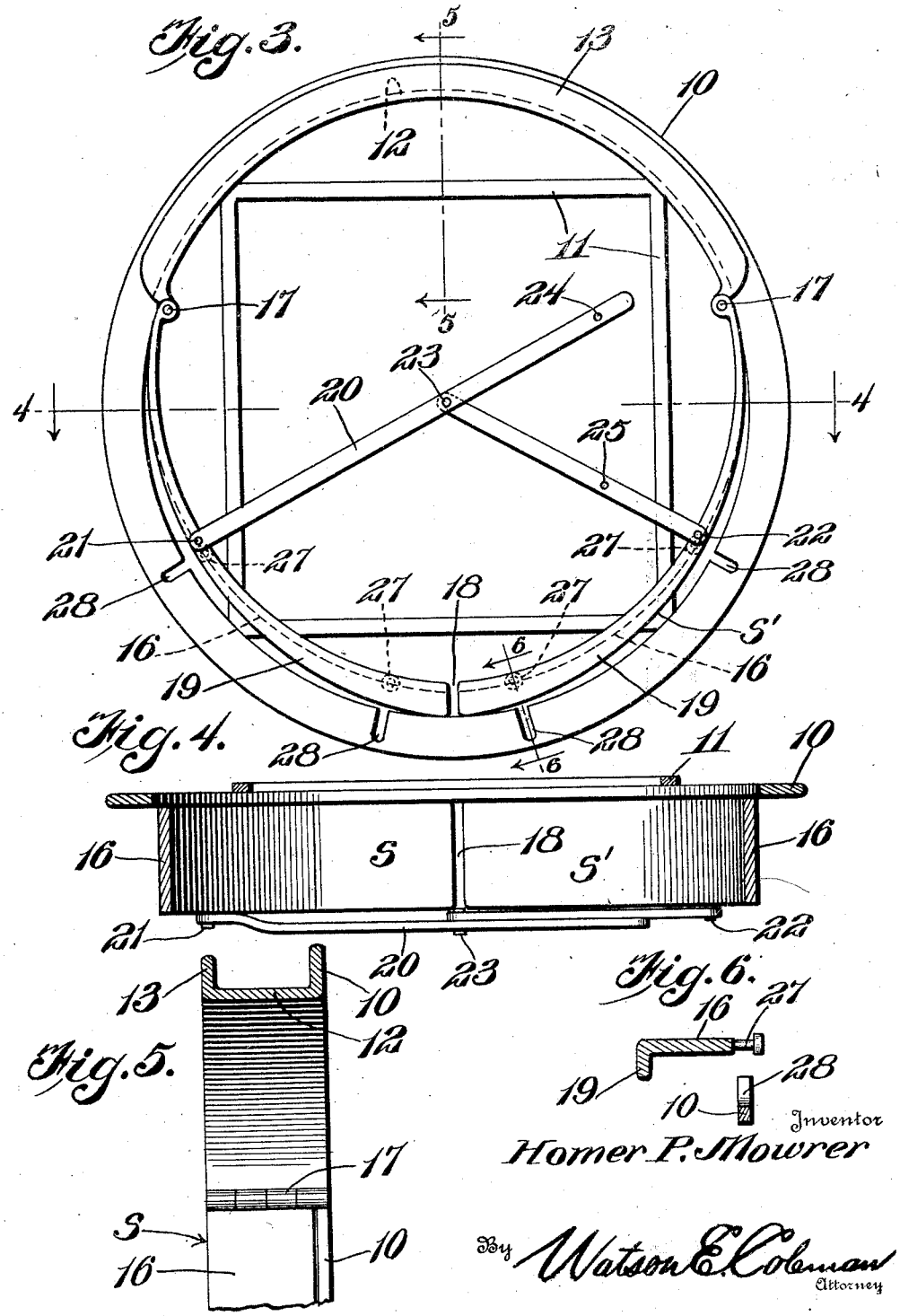

Patented Sept. 15, 1925.

1,554,020

UNITED STATES PATENT OFFICE.

HOMER P. MOWRER, OF MARSHALLTOWN, IOWA.

TIRE CARRIER.

Application filed February 26, 1925. Serial No. 11,861.

*To all whom it may concern:*

Be it known that I, HOMER P. MOWRER, a citizen of the United States, residing at Marshalltown, in the county of Marshall and State of Iowa, have invented certain new and useful Improvements in Tire Carriers, of which the following is a specification, reference being had to the accompanying drawings.

This invention relates to tire carriers and more particularly to a supporter for vehicle tires so constructed that the tire may be locked in position thereon.

An important object of the invention is to produce a device of this character which may be readily constructed from sheet metal such as malleable iron, thus producing a device which is not subject to breakage and which may be manufactured by stamping and rolling, thus reducing the cost thereof.

A further object of the invention is to provide a device to which the tire may be very readily applied and having swinging sections which move to lock the tire in applied position and prevent removal thereof.

These and other objects I attain by the construction shown in the accompanying drawings, wherein for the purpose of illustration is shown a preferred embodiment of my invention and wherein:—

Figure 3 is a rear elevation of the apparatus when in position to receive a tire;

Figure 4 is a section on the line 4—4 of Figure 3;

Figure 5 is a section on the line 5—5 of Figure 3; and

Figure 6 is a detailed sectional view on the line 6—6 of Figure 3.

Figure 1:
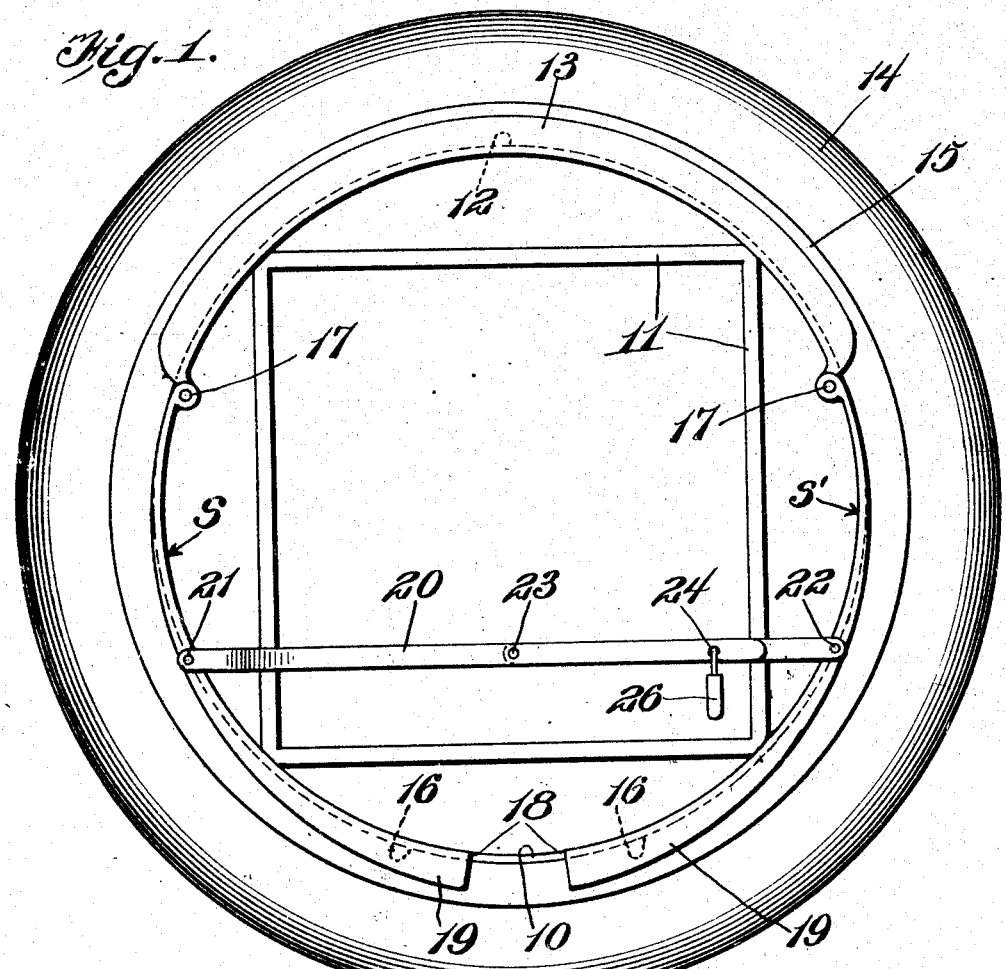
Figure 1 is a front elevation of a tire carrier constructed in accordance with my invention.
Figure 2:
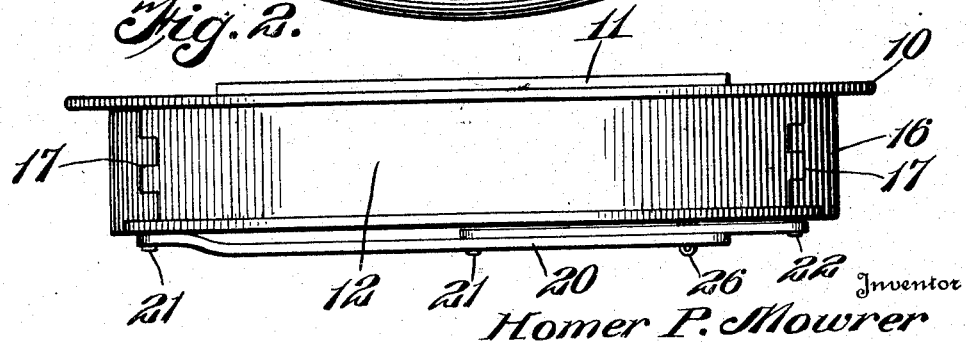
Figure 2 is a plan view thereof.

Referring now more particularly to the drawings, the numeral 10 designates a circular rear flange to which is secured the necessary supports 11 for attaching the supporter to the vehicle. Projecting outwardly from the upper portion of the inner periphery of this flange for approximately one-third of its circumference is a curved base or supporting flange 12 having at its outer edge an upstanding front flange 13. The flanges 10 and 13 are spaced from one another a distance sufficient to admit engagement of a tire 14 and its rim 15 therebetween to form with the flange 12 means for supporting the tire.

The ends of the flange 12 have pivoted similarly curved flanges 16, the connection between the flanges 12 and 16 being indicated at 17. These flanges 16 are each of a length slightly less than one-half of the remainder of the inner circumference of the inner rim so that their adjacent edges are spaced, as indicated at 18. Each of these flanges has projecting outwardly therefrom at the outer edge thereof outstanding rim flanges 19, corresponding to the outer flange 13 and forming a continuation of the same. Each flange 19 has its greatest width at the free end thereof and decreases in width toward the hinged end of the section.

It will be seen that two movable sections S, S' are thus provided, each having flanges for the reception therebetween of the tire 14 and its rim 15. The section S has pivoted thereto a lever 20, the pivotal connection 21 being at a point intermediate the ends of the section. At a similar point 22 the section S' has pivoted thereto a link, the outer end of which is pivoted to the lever intermediate the ends thereof, as at 23. This link and lever may be thrown into alignment with one another and when in alignment have coacting openings 24, 25, for the reception of a locking element such as padlock, indicated at 26. When these arms are in alignment, the flanges 16 form a continuation of the flanges 12 and a circular base is provided equal to the internal circumference of the tire rim 15 of the tire 14 which is to be mounted upon the carrier. When, however, the link and lever are moved to positions shown in Figure 3, the movable sections are drawn inwardly and because of the beveling of the flanges 19, these flanges move inwardly to a point within the circumference normally described by the combined flanges 12 and 16 so that a tire, the upper portion of which is rested upon and supported by the flange 12 and rim sections 10, 13, may be slipped over the flanges 19 and positioned so that it may be engaged between the flanges 10 and 19. In order to provide against tendency to swing on the part of the tire when positioned on the carrier and the strain which such swinging would place against the pivots 17 I mount upon the flanges 16 headed lugs 27 which coact with slots 28 formed in the rim 10 at the lower section thereof engaging in these slots so that their heads will prevent separation of the flanges 10 and 19. It will be obvious that a tire carrier constructed in accordance with the foregoing may be very readily produced and that the placing of a tire upon this carrier is a simple operation. To do this, it is simply necessary to elevate the tire so that its rim will engage between the rims 10, 13 and rest upon the flange 12. The lever 20 is then engaged with the hand and moved upwardly until the rim sections 19 are moved inwardly a distance sufficient to permit passage of the tire rim and when the tire is properly positioned, the lever is forced downwardly placing the flanges 10 and 19 upon opposite sides of the tire and locking these flanges 10 and 19 to one another so that the holder becomes solid and immovable. In this position, the lever 20 can be locked as hereinbefore described.

Since certain changes being possible in the construction hereinbefore set forth without materially departing from the spirit of my invention, I do not limit myself to such specific structure except as hereinafter claimed.

I claim:—

1. A tire carrier comprising a segment adapted to support a tire and provided upon opposite edges thereof with upstanding flanges, the inner flange being continued beyond the ends of the segment to provide a circular rim flange, a pair of arcuate segments pivoted to opposite ends of the first named segment and swingable to positions where they form continuations of the first named segment and produce a substantially complete circular band or to positions where they lie completely inwardly of the circumference upon which the first named segment is arranged, means for shifting said segments and for locking the segments in the first named position, a flange carried by each of said last named segments and opposing the circular rim flange of the first named segment, and means locking the last named segments to the circular rim flange when the last named segments are in the first named position.

2. A tire carrier comprising a segment adapted to support a tire and provided upon opposite edges thereof with upstanding flanges, the inner flange being continued beyond the ends of the segment to provide a circular rim flange, a pair of arcuate segments pivoted to opposite ends of the first named segment and swingable to positions where they form continuations of the first named segment and produce a substantially complete circular band or to positions where they lie completely inwardly of the circumference upon which the first named segment is arranged, means for shifting said segments and for locking the segments in the first named position and a flange carried by each of said last named segments and opposing the circular rim flange of the first named segment, and headed elements carried by the last named segments and extending into slots formed in said rim flange.

3. A tire carrier comprising a segment adapted to support a tire and provided upon opposite edges thereof with upstanding flanges, the inner flange being continued beyond the ends of the segment to provide a circular rim flange, a pair of arcuate segments pivoted to opposite ends of the first named segment and swingable to positions where they form continuations of the first named segment and produce a substantially complete circular band or to positions where they lie completely inwardly of the circumference upon which the first named segment is arranged, means for shifting said segments and for locking the segments in the first named position, a flange carried by each of said last named segments and opposing the circular rim flange of the first named segment, said flanges decreasing in size from the free to the pivoted ends of the last named segments and being disposed entirely within the circumference upon which the first named segment is arranged when the last named segments are in the last named position, and means locking the last named segments to the circular rim flange when the last named segments are in the first named position.

4. A tire carrier comprising a segment adapted to support a tire and provided upon opposite edges thereof with upstanding flanges, the inner flange being continued beyond the ends of the segment to provide a circular rim flange, a pair of arcuate segments pivoted to opposite ends of the first named segment and swingable to positions where they form continuations of the first named segment and produce a substantially complete circular band or to positions where they lie completely inwardly of the circumference upon which the first named segment is arranged, means for shifting said segments and for locking the segments in the first named position, and a flange carried by each of said last named segments and opposing the circular rim flange of the first named segment, said flanges decreasing in size from the free to the pivoted ends of the last named segments and being disposed entirely within the circumference upon which the first named segment is arranged when the last named segments are in the last named position, and headed elements carried by the last named segments and extending into slots formed in said rim flange.

In testimony whereof I hereunto affix my signature.

HOMER P. MOWRER.